United States Patent
Hecht

(10) Patent No.: US 7,151,805 B2
(45) Date of Patent: Dec. 19, 2006

(54) SYSTEM FOR GENERATING AN ANALOGUE I/Q SIGNAL FROM TWO OR MORE DATA STREAMS

(75) Inventor: Andreas Hecht, Eichenau (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 756 days.

(21) Appl. No.: 10/168,585

(22) PCT Filed: Dec. 7, 2000

(86) PCT No.: PCT/EP00/12354

§ 371 (c)(1),
(2), (4) Date: Sep. 19, 2002

(87) PCT Pub. No.: WO01/48996

PCT Pub. Date: Jul. 5, 2001

(65) Prior Publication Data
US 2003/0107446 A1 Jun. 12, 2003

(30) Foreign Application Priority Data
Dec. 23, 1999 (DE) .................. 199 62 760

(51) Int. Cl.
H04L 27/36 (2006.01)
(52) U.S. Cl. ...................... 375/298; 332/103
(58) Field of Classification Search ........... 375/298, 375/295; 332/103
See application file for complete search history.

(56) References Cited

U.S. PATENT DOCUMENTS 5,425,050 A * 6/1995 Schreiber et al. ........... 375/141
6,269,113 B1 * 7/2001 Park ........................... 375/146

FOREIGN PATENT DOCUMENTS

| DE | 199 57 093 | 11/1999 |
| EP | 0 534 255 | 9/1992 |
| EP | 0 588 542 | 9/1993 |
| EP | 0 589 594 | 9/1993 |
| EP | 0588542 A2 * | 9/1993 |
| EP | 0 680 169 | 4/1995 |

* cited by examiner

Primary Examiner—Mohammed Ghayour
Assistant Examiner—Leila Malek
(74) Attorney, Agent, or Firm—Lewis, Rice & Fingersh, L.C.

(57) ABSTRACT

A system and method for generating an I/Q signal for an I/Q modulator (10). The signal is composed of two or more data streams, which have been edited according to identical or different modulation methods. A known modulation encoder is used to generate corresponding digital I/Q values from a first inputted digital data stream. The I/Q values then undergo a digital-analogue conversion (8) that generates the corresponding analogue I/Q signals. The system includes an additional modulation generator that calculates digital I/Q values, or generates I/Q values from an additional inputted digital data stream. The digital I/Q values of the modulation encoder and the digital I/Q values of the modulation generator (10) are then added together, using digital adders (A3) located upstream of the digital-analogue converter (8).

10 Claims, 1 Drawing Sheet

SYSTEM FOR GENERATING AN ANALOGUE I/Q SIGNAL FROM TWO OR MORE DATA STREAMS

CROSS REFERENCE TO RELATED APPLICATIONS

This application claims priority to German Patent Application Serial No.: DE19962760.6 filed Dec. 23, 1999.

BACKGROUND

1. Field of the Invention

The invention relates to an arrangement for generating an analog or digital I/Q signal for an I/Q modulator, which signal is composed of two or more data streams processed by identical or different digital modulation methods.

2. Description of the Related Art

In modern transmission engineering, I/Q signals are used for data transmission that are modulated onto a high-frequency carrier in an I/Q modulator. There are extremely diverse modulation standards for the I/Q modulator for generating said I/Q signals. A frequently used modulation method is, for example, the time-division multiplex access method TDMA used in Europe and the USA for mobile-radio purposes or the code division multiplex method CDMA. In such systems, it is often desirable to transmit, via one and the same high-frequency carrier and using the same I/Q modulator, two or more I/Q signals that have been processed according to the same digital modulation standard, but with different input data streams, or that have been processed according to different digital modulation standards. Said different I/Q signals can each be generated separately in respective modulation encoders or modulation generators and then added; however, this is relatively expensive.

SUMMARY

The object of the invention is therefore to provide an arrangement with which this is possible with substantially reduced circuit expenditure.

Proceeding from an arrangement according to the preamble of the main claim, this object is achieved by the characterizing features of the latter. Advantageous developments emerge from the subclaims.

BRIEF DESCRIPTION OF THE DRAWINGS

The FIGURE shows the basic circuit diagram of an embodiment of an arrangement for generating an I/Q signal for an I/Q modulator.

DETAILED DESCRIPTION OF THE PREFERRED EMBODIMENT(S)

Figure 1:
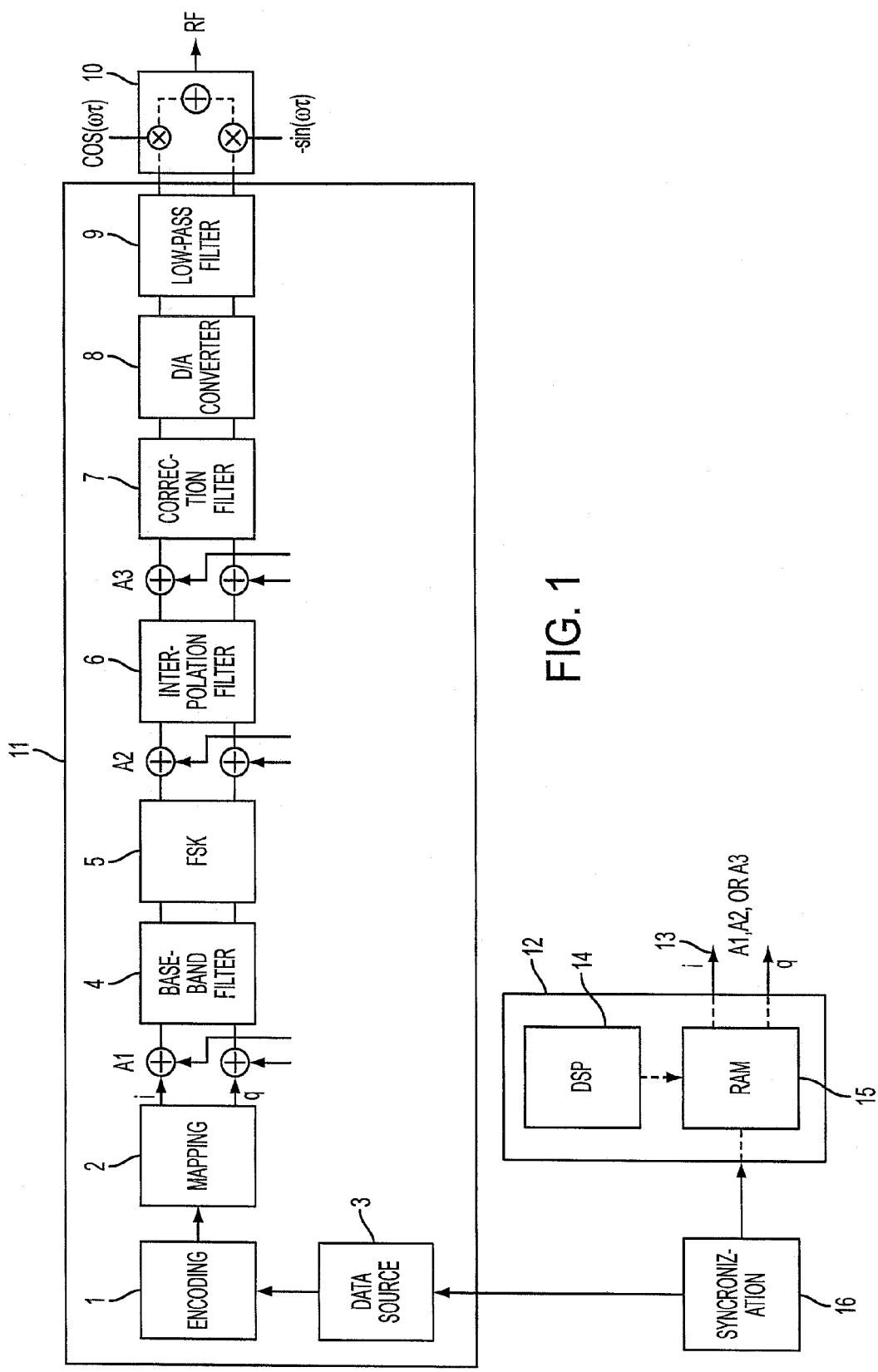

In accordance with the invention, the two or more data streams processed by identical or different digital modulation methods are already combined upstream of the D/A conversion in a purely digital way and, specifically, in a standard modulation encoder such as is known per se for processing a digital data stream to form an analog I/Q signal. It is only necessary to insert, at predetermined points in the I/Q branches, suitable adding stages via which the digital I/Q values of a further modulation generator can then already be added upstream of the D/A conversion. In this way, a number of assemblies become superfluous for the signal processing of the I/Q values of the additional modulation generator since said assemblies, for example the clock generator, the digital signal processor for the control, the D/A converter and the downstream low-pass filter, can be used concomitantly by the modulation encoder. In this connection, the additional modulation generator can be of any known type. It may be, for example, a further modulation encoder that generates the I/Q values to be added from an internal or external digital input data stream by encoding and mapping according to any known modulation standard. For measurement purposes, said additional modulation generator may also contain, in a memory, pre-calculated I/Q values that are read out in the system clock and are fed to adders, such as is known per se, for example, in the case of the AMIQ modulation generator supplied by Rohde & Schwarz.

The method according to the invention is particularly well suited for an arrangement for generating a digitally modulated test signal according to the earlier, non-predisclosed patent application DE 199 57 093 A1 of Rohde & Schwarz, in which some of the transmission channels of the test signal are generated in a modulation encoder directly from an internal or external modulation data stream according to a predetermined modulation standard and in which the I and Q values for at least some of the remaining channels of the test signal are fed from a memory to the modulation encoder as a pre-calculated modulation data sequence of limited length; the I and Q values generated separately in this way are then added and fed to the I/Q modulator. The disclosure in Patent Application DE 199 57 093 A1 is incorporated in its full scope in the present patent application.

The invention is explained in greater detail below by reference to a diagrammatic drawing using an exemplary embodiment.

The FIGURE shows the basic circuit diagram of a known modulation encoder 11, such as is used, for example, in the SMIQ vector signal generator supplied by Rohde & Schwarz, data sheet PD757.4582. Said modulation encoder 11 comprises an encoder and mapping unit 1, 2 in which corresponding I and Q values are generated from the data stream of an internal or external data source 3 depending on the chosen type of modulation. From the mapping unit 2, the I/Q values reach a base-band filter 4 in which a suitable pulse shaping is performed, and then a modulation format converter 5 in which the input signals are converted either into a linear PSK or QAM modulation or into a nonlinear FSK modulation. Provided downstream of said modulation format converter is an interpolation filter 6. The sequence of the stages 5 and 6 can also be interchanged. A correction filter 7 may furthermore be optionally disposed downstream of the interpolation filter 6. The I/Q values processed digitally in this way in separate I and Q branches are transformed into corresponding analog I/Q signals in the D/A converter 8 and, after traversing low-pass filters 9, are then fed to the actual I/Q modulator 10, in which said signals are modulated onto a high-frequency carrier.

In addition to said known modulation encoder arrangement, adding stages A1 to A3 are also inserted in the digital I/Q branches and, specifically, adding stages A1 can be disposed between the mapping unit 2 and the base-band filters 4, or adding stages A2 can be disposed between the modulation format converter 5 and the interpolation filter 6, or adding stages A3 may first be added downstream of the interpolation filter 6, but still upstream of the correction filter 7 (if present) and the D/A converter 8.

In addition to said modulation encoder 11 supplemented by one or more adding stages, a further modulation generator 12 is provided that supplies I/Q values again generated by a known complex type of modulation at its I/Q output 13. In the exemplary embodiment shown, said additional modulation generator 12 is designed as a so-called arbitrary waveform generator, such as is used, for example, in the AMIQ appliance supplied by Rohde & Schwarz, data sheet PD 757.3970.12. The calculated I and Q values are stored in a memory 15. They can be read out of said memory 15 as I/Q values to the output 13 under the control of a clock generator and a corresponding address generator. The reading-in and reading-out of the data from the data source 3 into the encoder 1 and the reading-out of the I/Q values from the memory 15 are synchronized by means of the synchronization unit 16. The I/Q values from the output 13 can now be fed either to the adding stages A1, A2 or A3 so that the digital I/Q values of the additional modulation generator 12 are combined with the digital I/Q values of the modulation encoder 11 and, after digital/analog conversion, are then fed as composite signals to the I/Q modulator 10 and are broadcast by one and the same high-frequency carrier.

If the I/Q values from output 13 are fed to the adders A1 (the adders A2 and A3 may be omitted or bypassed in this case), the I/Q values of the modulation encoder 11 from the output of the mapping unit 2 are added in real time and in symbol timing to the I/Q values of the modulation generator 12, the base-band filters being adjusted in such a way that, as in the case of modulation encoders, they normally bring about a pulse shaping. In this type of combination via adder A1, the base-band filters and the modulation format (linear PSK or QAM, or FSK modulation) are identical for both I/Q values.

If the I/Q values are fed from the output 13 to the adders A2, the I/Q values are brought together upstream of the interpolation filter. In order to obtain identical data rates in each case under these circumstances, the I/Q values in the modulation generator 12 are either already suitably prepared during the data storage in the memory 15 or an additional data rate converter that is not shown is inserted in addition. In this case, the base-band filtering for the two I/Q values may be different. Since the adding only takes place downstream of the modulation format converter, different modulation formats may also be used.

If the sequence is interchanged between the units 5 and 6 (the modulation format converter 5 is disposed downstream of the interpolation filter 6), the addition takes place upstream of the modulation format conversion and, in this case, the modulation formats cannot be chosen differently for the two signals.

Finally, a third possibility is to only bring the signals together upstream of the D/A converter 8 or a correction filter 7 possibly present via the adder A3.

In the same way, I/Q values of two or more additional modulation generators 12 may also be combined with the I/Q values of the modulation encoder 11 and this may take place at any of the points A1, A2 or A3, the adders being provided in this case with three or more inputs. However, the adding can also be partitioned over various points, for example in such a way that the I/Q values of a first modulation generator 12 are added via the adders A1, the I/Q values of a second modulation generator 12' are added via the adders A2, etc.

The arrangement can also be used for processing the I/Q values of the modulation generator 12, the encoder 1 and the mapping unit 2 not being operative in this case. Only the I/Q values of the modulation generator 12 are therefore fed to the base-band filter via the adding stages A1. The base-band filter 4 is in this case programmed as a low-pass filter for band limitation or as an interpolation filter, in which case the actual interpolation filter 6 can either be omitted or adjusted in such a way that it acts as a cascaded interpolation filter. All the errors that occur in the signal path can be corrected by an inserted correction filter 7.

The invention claimed is:

1. An arrangement for generating an I/Q signal for an I/Q modulator using a modulation encoder, the arrangement comprising:
    a modulation encoder including:
        an encoding and mapping unit;
        a digital base-band filter whose filter properties are adjustable,
    said digital base-band filter disposed after said encoding and mapping unit;
        a digital modulation format converter disposed after said base-band filter;
        an interpolation filter disposed after said modulation format converter;
        a digital/analog converter disposed after said interpolation filter;
        an analog low-pass filter disposed after said digital/analog converter; and
        at least one adder disposed after said encoding and mapping unit and before said digital/analog converter,
        wherein, in said modulation encoder, corresponding digital I/Q values are generated from a first digital input data stream and the corresponding analog I/Q signals are generated therefrom after digital/analog conversion, and
    at least one modulation generator in which calculated digital I/Q values or digital I/Q values generated from a further digital input data stream are generated,
    wherein the digital I/Q values of the modulation encoder and the digital I/Q values of the modulation generator are added via said at least one adder.

2. The arrangement of claim 1, characterized in that at least one of said at least one adder is disposed before said band-pass filter.

3. The arrangement of claim 1, characterized in that at least one of said at least one adder is disposed between the modulation format converter and the interpolation filter.

4. The arrangement of claim 1, characterized in that at least one of said at least one adder is disposed after said interpolation filter.

5. The arrangement of claim 1 wherein said modulation encoder further includes a digital correction filter disposed after said interpolation filter.

6. The arrangement of claim 5, characterized in that at least one of said at least one adder is disposed after said interpolation filter but before said digital correction filter.

7. An arrangement for generating an I/Q signal for an I/Q modulator using a modulation encoder, the arrangement comprising:
    a modulation encoder including:
        an encoding and mapping unit;
        a digital base-band filter whose filter properties are adjustable, said digital base-band filter disposed after said encoding and mapping unit;
        an interpolation filter disposed after said base-band filter;
        a digital modulation format converter disposed after said interpolation filter;
        a digital/analog converter disposed after said digital modulation format converter;

an analog low-pass filter disposed after said digital/analog converter; and at least one adder disposed after said encoding and mapping unit and before said digital/analog converter, wherein, in said modulation encoder, corresponding digital I/Q values are generated from a first digital input data stream and the corresponding analog I/Q signals are generated therefrom after digital/analog conversion, and at least one modulation generator in which calculated digital I/Q values or digital I/Q values generated from a further digital input data stream are generated, wherein the digital I/Q values of the modulation encoder and the digital I/Q values of the modulation generator are added via said at least one adder.

8. The arrangement of claim 7 characterized in that at least one of said at least one adder is disposed between base-band filter (4) and interpolation filter (6).

9. The arrangement of claim 7 wherein said modulation encoder further includes a digital correction filter disposed after said interpolation filter.

10. The arrangement of claim 7, characterized in that at least one of said at least one adder is disposed before said band-pass filter.

* * * * *